Patented July 27, 1954

2,684,957

UNITED STATES PATENT OFFICE 2,684,957

LOW COMPRESSION SET SILOXANE RUBBERS

George M. Konkle, Midland, Mich., assignor to Dow Corning Corporation, Midland, Mich., a corporation of Michigan No Drawing. Application May 2, 1952,
Serial No. 285,790

8 Claims. (Cl. 260—37)

This invention relates to low compression set siloxane rubbers.

The use of siloxane rubbers as high temperature elastomers has met with great commercial success. Due to the unusual temperatures at which these materials are employed, compression set of the rubber is often quite an important factor. For example, at temperatures of 150° C. the compression set of a normal commercial siloxane elastomers will run as high as 95 per cent when subjected to A. S. T. M. Test D395—Method B. Since silicone rubbers are normally employed at this range of temperature, it can be seen that it is necessary to reduce the compression set in order to have the material useful for gasketing and similar applications. It has been found in the past that certain mercury compounds will reduce the compression set at elevated temperatures but mercury is objectional both because of its volatility with resulting toxicity and because it drastically reduces the other properties of the rubber such as tensile strength and elongation.

It is the object of this invention to provide an additive for siloxane rubbers which is non-volatile and which substantially reduces the compression set at elevated temperatures without substantially reducing the other stress strain properties of the rubber.

This invention relates to a composition comprising a polymeric organosiloxane having from 1.9 to 2 organic radicals per silicon atom and having a viscosity of at least 10,000 cs. at 25° C., from ¾ to 8 parts by weight based upon 100 parts by weight of the siloxane of cadmium peroxide, oxide, or carbonate, and from 1 to 10 per cent by weight based on the weight of the siloxane of a vulcanizing agent.

The solixanes employed in this invention are commercial products and for the purpose of this invention the organic radicals substituted on the silicon may be methyl or phenyl radicals. Thus, the siloxanes employed herein may be dimethylsiloxane, phenylmethylsiloxane, and diphenylsiloxane together with limited amounts of monomethyl and monophenyl siloxanes. It is preferred that at least 50 percent of the radicals be methyl. Any siloxane having a viscosity above 10,000 cs. may be employed. In order to facilitate mixing, the siloxanes should be either readily deformable or soluble in an organic solvent. Thus, the polymer may be a relatively fluid liquid, a non-flowing benzene soluble dough or a benzene insoluble gum.

The fillers employed in the elastomers of this invention may be any of the inorganic heat-stable fillers normally employed with siloxane elastomers. Best results are obtained by employing silica fillers. These fillers may be both of the non-reinforcing types such as diatomaceous earth or the so called reinforcing fillers such as fume silicas and silica aerogels. The fillers are normally employed in amounts from 10 to 300 parts based upon the weight of the siloxane.

The additives employed in this invention are the oxide, peroxide, or carbonate of cadmium. It has been found that when either of these materials or mixtures thereof are employed in amounts less than ¾ part by weight based on the siloxane that little or no improvement in the compression set of the elastomer is obtained. When more than 8 parts of the additive is employed, the tensile and elongation of the elastomer are drastically reduced.

It has been found that even lower compression sets are obtained when mixtures of the above cadmium compounds and the oxide, peroxide or carbonate of zinc, are employed. When mixtures of the above compounds of these two metals are used, the total weight of additive should be from ¾ part to 8 parts by weight based upon 100 parts by weight of the siloxane. Best results are obtained when the weight ratio of zinc compound to the cadmium compound is not greater than 1:1. The beneficial effect of employing these mixtures of cadmium and zinc compounds is particularly apparent after prolonged heating at 150° C.

Any vulcanizing agent may be employed in the elastomers of this invention. The common commercial vulcanizing agents are organic peroxides containing at least one aromatic acyl radical in the molecule. The best examples of these are tertiary butylperbenzoate and benzoyl peroxide. When employed the vulcanizing agent is normally used in amount of 1 to 10 parts by weight based upon the weight of the siloxane.

The elastomers of this invention are of particular utility in those applications in which the elastomer is subjected to compression at elevated temperatures. The compression sets of the materials of this invention range between 8 and 30 per cent when subjected to the above test for 22 hours at 150° C. The properties of the elastomers of this invention make them particularly useful for gaskets.

The following examples are illustrative only and are not to be construed as limiting the invention which is properly delineated in the appended claims.

EXAMPLE 1

100 parts by weight of a methylpolysiloxane gum which had been prepared by polymerizing dimethylpolysiloxane cyclics with KOH, 90 parts by weight of a diatomaceous earth known as "Celite Super Floss," 3 parts by weight of benzoyl peroxide and various amounts of the additives shown in Table 1 below were milled until a uniform mix was obtained and thereafter vulcanized by heating at 126° C. for 5 minutes. The elastomers were then cured in an oven for 24 hours at 250° C. The physical properties of each sample were determined as shown in the table below. The compression set was determined in accordance with A. S. T. M. Test D395—Method B, after 22 and 70 hours respectively at a temperature of 150° C.

Table 1

| No. | Additive in parts by weight | | After 24 hours at 250° C. | | | Percent Compression set after— | |
|---|---|---|---|---|---|---|---|
| | Cd | Zn | Durometer | Tensile in p. s. i. | Percent Elongation at break | 22 hours at 150° C. | 70 hours at 150° C. |
| (1) | | | 66 | 603 | 93 | 96 | 99 |
| (2) | 1.5CdO | | 62 | 615 | 100 | 14 | 22 |
| (3) | 1CdO | 1ZnO | 68 | 634 | 90 | 8 | 17 |
| (4) | .75CdO | 1ZnO | 72 | 532 | 90 | 8 | 28 |
| (5) | 3CdCO₃ | | 66 | 586 | 120 | 12 | 20 |
| (6) | 1CdCO₃ | 1ZnO | 68 | 580 | 100 | 9 | 16 |
| (7) | 3CdCO₃ | 3ZnO | 69 | 530 | 80 | 8 | 13 |

Run (1) is included for comparison. Runs (3), (6) and (7) illustrate the advantage of employing combinations of zinc and cadmium.

EXAMPLE 2

In this example, 100 parts by weight of a benzene soluble non-flowing dimethylpolysiloxane, 45 parts by weight of a fumed silica, 1.5 parts by weight benzoyl peroxide and cadmium oxide in the amounts shown in Table 2 below, were milled and thereafter vulcanized at 126° C. for 5 minutes. The elastomer was then cured 24 hours at 250° C. At the end of this time the compression set of each sample was determined as in Example 1.

Table 2

| Parts by weight— CdO | After 24 hours at 250° C. | | | Percent Compression set after— | |
|---|---|---|---|---|---|
| | Durometer | Tensile in p. s. i. | Percent Elongation at break | 22 hours at 150° C. | 70 hours at 150° C. |
| | 56 | 887 | 297 | 68 | 81 |
| 1 | 63 | 875 | 215 | 28 | 47 |
| 5 | 65 | 620 | 170 | 28 | 43 |

EXAMPLE 3

When 100 parts by weight of a non-flowing benzene soluble polymer having the composition 5 mol per cent phenylmethylsiloxane or 5 mol per cent diphenylsiloxane and 95 mol per cent dimethylsiloxane is compounded with 45 parts of a fume silica, 1 part of cadmium peroxide, 1 part of zinc carbonate and 1.5 parts of benzoylperoxide and vulcanized as in Example 2, a low compression set elastomer is obtained.

That which is claimed is:

1. A composition of matter comprising a polymeric organosiloxane having a viscosity of at least 10,000 cs. at 25° C. in which siloxane the organic radicals are selected from the group consisting of phenyl and methyl radicals and there being from 1.9 to 2 of said radicals per silicon atom, a filler, a vulcanizing agent and from ¾ to 8 parts by weight based on 100 parts by weight of the siloxane of a cadmium compound selected from the group consisting of cadmium oxide, peroxide and carbonate.

2. A composition in accordance with claim 1 wherein the organic radicals are methyl radicals, and wherein the filler is a silica filler.

3. A vulcanized siloxane elastomer in which the siloxane has from 1.9 to 2 organic radicals selected from the group consisting of phenyl and methyl radicals, per silicon atom, a filler and from ¾ to 8 parts by weight based on 100 parts by weight of the siloxane of a compound selected from the group consisting of cadmium oxide, peroxide and carbonate.

4. A vulcanized elastomer in accordance with claim 3 in which the radicals are methyl radicals and the filler is a silica filler.

5. A composition of matter composed of an organopolysiloxane having a viscosity of at least 10,000 cs. at 25° C. in which siloxane there are from 1.9 to 2 organic radicals per silicon atom, said radicals being selected from the group consisting of methyl and phenyl radicals, a filler, a vulcanizing agent and from ¾ to 8 parts by weight based on the weight of 100 parts of the siloxane of an additive which is composed of a zinc component selected from the group consisting of the oxide, peroxide and carbonate of zinc and a cadmium component selected from the group consisting of the oxide, peroxide and carbonate of cadmium, in which additive the weight ratio of the zinc component to cadmium component is not greater than 1 to 1.

6. A composition in accordance with claim 5 in which the organic radicals are methyl radicals and in which the filler is a silica filler.

7. A vulcanized siloxane elastomer in which the siloxane has from 1.9 to 2 organic radicals selected from the group consisting of phenyl and methyl radicals, per silicon atom, a filler and from ¾ to 8 parts by weight based on the weight of 100 parts of the siloxane of an additive which is composed of a zinc component selected from the group consisting of the oxide, peroxide and carbonate of zinc and a cadmium component selected from the group consisting of the oxide, peroxide and carbonate of cadmium, in which additive the weight ratio of the zinc component to the cadmium component is not greater than 1 to 1.

8. A vulcanized elastomer in accordance with claim 7 in which the radicals are methyl radicals and the filler is a silica filler.

References Cited in the file of this patent

UNITED STATES PATENTS

| Number | Name | Date |
|---|---|---|
| 2,448,530 | Jones | Sept. 7, 1948 |
| 2,449,572 | Welsh | Sept. 21, 1948 |
| 2,460,795 | Warrick | Feb. 1, 1949 |
| 2,541,137 | Warrick | Feb. 13, 1951 |

FOREIGN PATENTS

| Number | Country | Date |
|---|---|---|
| 606,301 | Great Britain | Aug. 11, 1948 |
| 630,883 | Great Britain | Oct. 24, 1949 |

OTHER REFERENCES

Chem. and Eng. News, Nov. 10, 1952, vol. 30, No. 45, page 4720.